United States Patent
Xu et al.

(10) Patent No.: US 11,298,670 B2
(45) Date of Patent: Apr. 12, 2022

(54) COMPACT QUENCH ZONE REACTOR INTERNALS

(71) Applicant: UOP LLC, Des Plaines, IL (US)

(72) Inventors: Zhanping Xu, Inverness, IL (US); Pengfei Chen, Glenview, IL (US); John Christian Maley, Chicago, IL (US); Shree Prakash Pathak, Haryana (IN); Rebecca Mudrock, Wauconda, IL (US); Nicholas W. Bridge, Oak Park, IL (US)

(73) Assignee: UOP LLC, Des Plaines, IL (US)

(*) Notice: Subject to any disclaimer, the term of this patent is extended or adjusted under 35 U.S.C. 154(b) by 0 days.

(21) Appl. No.: 17/148,698

(22) Filed: Jan. 14, 2021

(65) Prior Publication Data

US 2021/0331132 A1    Oct. 28, 2021

Related U.S. Application Data

(60) Provisional application No. 63/014,796, filed on Apr. 24, 2020.

(51) Int. Cl.
| | | |
|---|---|---|
| *B01J 8/00* | (2006.01) | |
| *B01J 8/02* | (2006.01) | |
| *B01J 8/04* | (2006.01) | |
| *B01J 19/00* | (2006.01) | |
| *B01J 19/24* | (2006.01) | |

(52) U.S. Cl.
CPC ........... *B01J 8/0492* (2013.01); *B01J 8/0278* (2013.01); *B01J 2208/00849* (2013.01); *B01J 2208/00929* (2013.01); *B01J 2208/00938* (2013.01)

(58) Field of Classification Search
CPC ..... B01J 8/00; B01J 8/02; B01J 8/0278; B01J 8/04; B01J 8/0492; B01J 19/00; B01J 19/24; B01J 2208/00; B01J 2208/00796; B01J 2208/00823; B01J 2208/00831; B01J 2208/00849; B01J 2208/00893; (Continued)

(56) References Cited

U.S. PATENT DOCUMENTS

| | | |
|---|---|---|
| 5,635,145 A | 6/1997 | Den Hartog et al. |
| 6,984,365 B2 | 1/2006 | Nelson et al. |

(Continued)

FOREIGN PATENT DOCUMENTS

| | | |
|---|---|---|
| EP | 1721660 A1 | 11/2006 |
| WO | 9014154 | 11/1990 |

OTHER PUBLICATIONS

International Search Report from corresponding PCT application No. PCT/US2021/027190 dated Aug. 5, 2021.

(Continued)

*Primary Examiner* — Natasha E Young

(57) ABSTRACT

Hydroprocessing reactor internals height reduction is achieved by placing a mixing chamber above the collection tray. The mixing chamber has spillways on the top (top spillways) and the side of the mixing chamber (side spillways) for fluid entry. The design of the spillways has a significant impact on pressure drop. The pressure drop is reduced by having wide shallow spillways rather than narrow and deep spillways without impacting mixing performance. With both side and top spillways, the height of the mixing chamber can be reduced significantly with minimal impact on fluid mixing and pressure drop.

20 Claims, 2 Drawing Sheets

(58) Field of Classification Search
CPC .... B01J 2208/00929; B01J 2208/00938; B01J 2219/00; B01J 2219/24
See application file for complete search history.

(56) References Cited

U.S. PATENT DOCUMENTS

| | | |
|---|---|---|
| 7,052,654 B2 | 5/2006 | McDougald et al. |
| 7,074,372 B2 | 7/2006 | Muldowney et al. |
| 7,601,310 B2 | 10/2009 | Breivik et al. |
| 8,673,246 B2 | 3/2014 | Chen et al. |
| 9,079,141 B2 | 7/2015 | Boyak et al. |
| 9,211,516 B2 | 12/2015 | Lesniak et al. |
| 9,295,959 B2 | 3/2016 | Xu et al. |
| 10,376,856 B2 | 8/2019 | Xu et al. |
| 10,589,244 B1 | 3/2020 | Xu |
| 2019/0105627 A1* | 4/2019 | Xu ..................... B01J 8/0496 |

OTHER PUBLICATIONS

Written Opinion from corresponding PCT application No. PCT/US2021/027190 dated Aug. 5, 2021.

* cited by examiner

COMPACT QUENCH ZONE REACTOR INTERNALS

RELATED APPLICATIONS

This application claims the benefit of U.S. Provisional Patent Application Ser. No. 63/014,796 filed on Apr. 24, 2020, the entirety of which is incorporated herein by reference.

BACKGROUND

A wide variety of processes use co-current flow reactors, where a fluid or fluids flow over a solid bed of particulate materials, to provide for contact between the fluid and solid particles. In a reactor, the solid may comprise a catalytic material on which the fluid reacts to form a product. The fluid can be a liquid, vapor, or mixture of liquid and vapor, and the fluid reacts to form a liquid, vapor, or a mixture of a liquid and vapor. The processes cover a range of processes, including hydrocarbon conversion, hydrocracking and hydrotreating.

Co-current reactors with fixed beds are constructed such that the reactor allows for the fluid to flow over the catalyst bed. When the fluid is a liquid, a vapor, or liquid and vapor mixture, the fluid is usually directed to flow downward through the reactor. Multibed reactors are also frequently used, where the reactor beds are stacked over one another within a reactor shell. Typically, they are stacked with some space between the beds.

The interbed spaces are often created to provide for intermediate treatment of the process fluid, such as cooling, heating, mixing and redistribution.

In exothermic catalytic reactions, the control of fluid temperature and distribution is important. The temperature and composition of the fluids from an upper catalyst bed and from outside of reactor should be well mixed before being distributed to the lower catalyst bed. Initial poor fluid mixing and distribution at top of a catalyst bed can persist or grow as the process fluids move down the reactor. Hot spots can develop and cause rapid deactivation of the catalyst and shorten the reactor operation cycle length. The space between catalyst beds is for the injection of a quench gas or liquid and for fluid mixing and distribution. In hydrocarbon processing, the quench gas is often a cool hydrogen/hydrocarbon stream. However, cooling a fluid without controlling the mixing and distribution leads to uneven reactions and uneven temperature distribution in subsequent reactor beds. And complex mixing and distribution systems takes up valuable space in a reactor chamber holding multiple catalyst beds.

There is always a desire for minimizing the space between catalyst beds for introducing a quench fluid and mixing the vapor and liquid along with the quench fluid. Particularly, for existing hydroprocessing reactors, it is often desired to reduce the space between catalyst beds for increasing catalyst loading so that the reactor throughput or operating cycle time or both can be increased. Even for new reactors, it is often desired to reduce the overall size of the reactors to reduce capital expenditure and the profile of the reactor in a processing plant. Therefore, it is desirable to provide for good mixing and distribution of fluids between adjacent catalyst beds in a relatively short interbed space.

The design of reactor internals to overcome these limitations can save significantly on the valuable space within a reactor for maximizing catalyst loading. Further, it is often desirable to revamp existing reactors to improve processes with reduced quench zone space between catalyst beds. New reactor internals that improve the utilization of the space within a reactor shell can provide significant cost savings, and allow for revamps of existing reactors to meet new operational and regulatory requirements.

DESCRIPTION OF THE INVENTION

Figure 1:
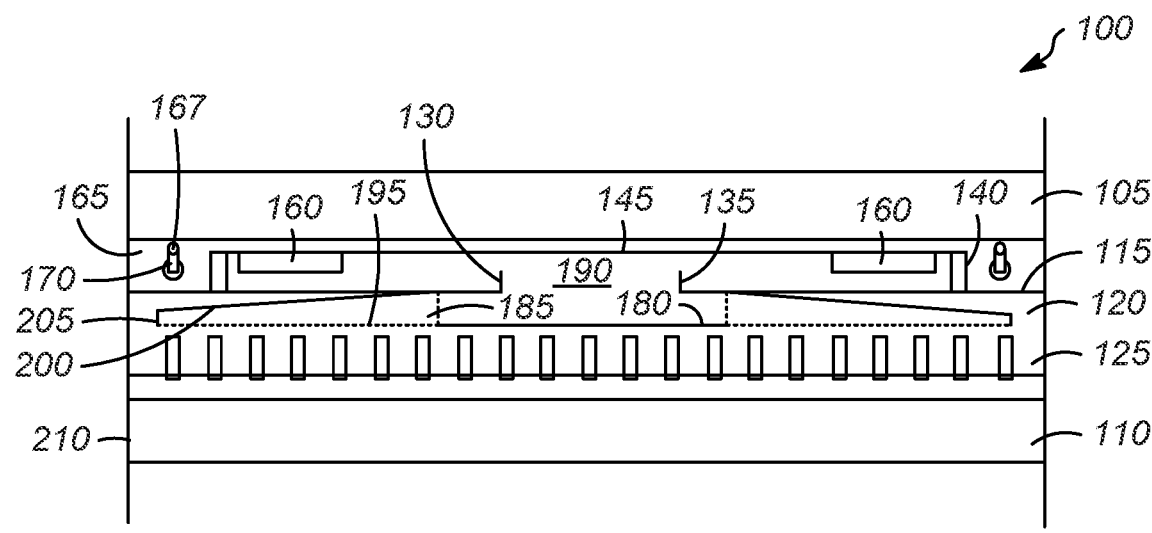
FIG. 1 is a cross section of one embodiment of the hydroprocessing reactor internals of the present invention.

Minimizing hydroprocessing reactor internals (HRI) height and maximizing catalyst loading in revamp of existing reactors help increase production rate and/or operation cycle length which improves the economics of the process. In this design, HRI height reduction is achieved by placing a mixing chamber above the collection tray. The pressure drop is reduced using a special spillway design. The mixing chamber has spillways on the top (top spillways) and the side of the mixing chamber (side spillways) for fluid entry. Fluids exit the mixing chamber through a central opening in the collection tray. It was found through Computational Fluid Dynamics (CFD) that the design of the spillways has a significant impact on pressure drop and that the pressure drop is reduced by having wide shallow spillways rather than narrow and deep spillways without impacting mixing performance. With both side and top spillways, it was surprisingly found that the height of the mixing chamber can be reduced significantly with minimal impact on fluid mixing and pressure drop.

The hydroprocessing reactor quench zone internals comprise a collection tray, a mixing chamber, a ring distributer, a rough liquid distribution tray, and a vapor-liquid distribution tray. Fluid mixing occurs mainly in the mixing chamber.

The collection tray is a plate with a central opening.

The mixing chamber is above the collection tray and surrounds the central opening for downward liquid flow, or vapor flow, or both vapor and liquid flow. The mixing chamber has an outer wall and a top plate attached to the outer wall. There are at least one spillway located in the top plate of the mixing chamber and at least one spillway in the outer wall to allow fluid to flow through. Typically, the spillways in the top plate are evenly spaced around the circular top plate; the spillways in the outer wall are also typically evenly spaced around the outer wall. There are typically the same number of spillways in the top plate and in the outer wall. Typically, the spillways in the top plate and those in the outer wall are in the same location around the wall. However, the number of top and side spillways may differ, and they may be offset from each other for a particular embodiment. The spillways in the top plate are positioned close to the outer wall to maximize their distance to the central opening for increasing fluid residence time and improving mixing.

A ring quench distributor is located around the fluid collection tray between the mixing chamber and the reactor shell to eliminate the vertical space occupied by the distributor. The injectors attached to the ring quench distributor manifold are positioned above the top plate of the mixing chamber and oriented tangentially to the ring manifold for injecting quench fluid while avoiding liquid from getting into the distributor. Most of the vapor and part of the liquid enter the mixing chamber tangentially through the spillways in the top of the mixing chamber, while the rest of the liquid and vapor enters the mixing chamber tangentially through openings in the side of the mixing chamber with directional baffles. The mixing chamber has a central opening for fluid to flow out.

The rough liquid distribution tray has a central pan for receiving vapor and liquid out of the mixing chamber. The details of the rough liquid distribution tray are not critical; any suitable rough liquid distribution tray can be used. In one embodiment as shown in U.S. Pat. No. 5,837,208, the tray has perforations on the floor outside the central pan for liquid flow into a vapor-liquid distribution tray below and an annular opening zone between the outer edge of the tray and reactor shell for vapor flow into the vapor-liquid distribution tray. In another embodiment as shown in U.S. Pat. No. 9,295,959, the rough liquid distribution tray may have pie-shape chimneys extending from the central pan to the outer edge of the tray for vapor bypassing into the vapor-liquid distribution tray so that the required space between rough liquid distribution tray and the vapor-liquid distribution tray is reduced. In yet another embodiment, the rough liquid distribution tray includes multiple fluid distribution troughs attached to the central pan that extended radially outwards with the outer end close to the reactor shell. The fluid distribution trough bottom has holes for liquid flow to the vapor-liquid distribution tray below. The fluid distribution trough has side walls sloped from the central pan to the fluid distribution trough outer end and an end wall for retaining liquid within the fluid distribution trough for liquid distribution. Vapor and liquid flow horizontally from the central pan to the distribution troughs. Vapor leaves the fluid distribution trough from top of the walls and flows down to the vapor-liquid distribution tray through the open spaces between the fluid distribution troughs and between the fluid distribution troughs and the reactor shell.

The rough liquid distribution tray assists the vapor-liquid distribution tray for uniform fluid distribution to a lower catalyst bed.

Any suitable vapor-liquid distribution tray can be used. In one embodiment as shown in U.S. Pat. No. 6,769,672, the tray has a plurality of distributors and each distributor has fluid paths with different resistance to fluid flow. In another embodiment as shown in U.S. Pat. No. 7,506,861, the tray has a plurality of distributors and each distributor has a liquid conduit attached to a downcomer for introducing liquid and an orifice at top of the downcomer for vapor entry. The liquid is mixed with the downwardly flowing vapor in the downcomer. The downcomer has orifices inside for enhancing vapor-liquid mixing and a plate below for spreading liquid.

As compared with the conventional design of HRI, the new design of the quench zone HRI shortens the space between catalyst beds by about 12 to 24 inches.

One aspect of the invention is a device for the mixing and distribution of fluid between catalyst beds. In one embodiment, the device comprises: a collection tray comprising a central opening, the collection tray in fluid communication with a bottom of an upper catalyst bed; a mixing chamber above the collection tray, the mixing chamber positioned around the central opening, the mixing chamber having an outer wall located at a position inward of a reactor wall and a top plate attached to the outer wall, the outer wall having at least one side spillway to allow fluid to pass therethrough, and the top plate having at least one top spillway to allow fluid to pass therethrough, the top plate in fluid communication with the bottom of the upper catalyst bed; a ring quench distributor comprising an injector for injecting quench fluid into a space above the collection tray between the reactor wall and the outer wall; a rough liquid distribution tray comprising a central pan in fluid communication with the central opening of the collection tray; and a vapor-liquid distribution tray in fluid communication with the rough liquid distribution tray and a top of a lower catalyst bed.

In some embodiments, the at least one top spillway is aligned with the at least one side spillway.

In some embodiments, there are at least four top spillways and at least four side spillways.

In some embodiments, the at least four top spillways are aligned with the at least four side spillways and wherein the at least four top spillways and the at least four side spillways are equally spaced around the mixing chamber.

In some embodiments, the device further comprises a directional baffle at the at least one side spillway.

In some embodiments, the directional baffle extends inwardly into the mixing chamber.

In some embodiments, the directional baffle extends outwardly into the space between the reactor wall and the outer wall.

In some embodiments, the directional baffle forms an angle with respect to a tangent of the outer wall of less than 30°.

In some embodiments, the outer wall has a height and wherein the at least one side spillway has a height equal to the height of the outer wall.

In some embodiments, the floor of the collection tray outside the mixing chamber forms an angle with respect to the floor of the collection tray inside the mixing chamber.

In some embodiments, the injector is positioned above the top plate of the mixing chamber.

In some embodiments, the mixing chamber has a plurality of inner vertical support plates oriented tangentially to one or more concentric circles to support the top plate and to promote rotational fluid flow inside the mixing chamber.

Another aspect of the invention is a device for the mixing and distribution of fluid between catalyst beds. In one embodiment, the device comprises: a collection tray comprising a central opening, the collection tray in fluid communication with a bottom of an upper catalyst bed; a mixing chamber above the collection tray, the mixing chamber positioned around the central opening, the mixing chamber having an outer wall located at a position inward of a reactor wall and a top plate attached to the outer wall, the outer wall having at least two side spillways to allow fluid to pass therethrough, and the top plate having at least two top spillways to allow fluid to pass therethrough, the at least two top spillways being aligned with the at least two side spillways, and wherein the at least two top spillways and the at least two side spillways being equally spaced around the mixing chamber, the top plate in fluid communication with the bottom of the upper catalyst bed; a ring quench distributor comprising an injector for injecting quench fluid into a space above the collection tray between the reactor wall and the outer wall; a rough liquid distribution tray comprising a central pan in fluid communication with the central opening of the collection tray; and a vapor-liquid distribution tray in fluid communication with the rough liquid distribution tray and a top of a lower catalyst bed.

In some embodiments, there are at least four top spillways and at least four side spillways.

In some embodiments, the device further comprises a directional baffle at the at least one side spillway.

In some embodiments, the directional baffle extends inwardly into the mixing chamber or the directional baffle extends outwardly into the space between the reactor wall and the outer wall; and wherein the directional baffle forms an angle with respect to a tangent of the outer wall of less than 30°.

In some embodiments, the outer wall has a height and wherein the at least two side spillways have a height equal to the height of the outer wall.

In some embodiments, the floor of the collection tray outside the mixing chamber forms an angle with respect to the floor of the collection tray inside the mixing chamber.

In some embodiments, the injector is positioned above the top plate of the mixing chamber.

In some embodiments, the mixing chamber has a plurality of inner vertical support plates oriented tangentially to one or more concentric circles to support the top plate and to promote rotational fluid flow inside the mixing chamber.

Figure 2:
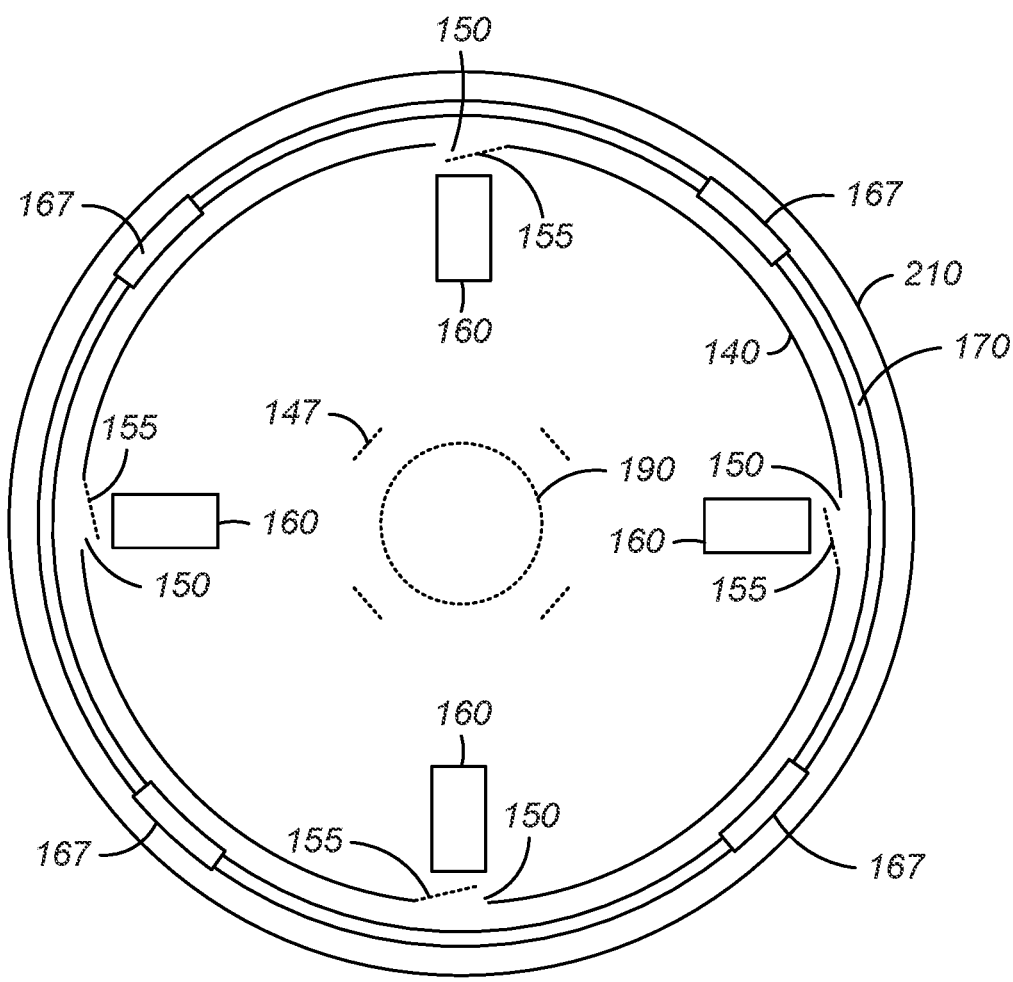
FIG. 2 is a top view of one embodiment of the collection tray, mixing chamber, and ring quench distributor of the present invention.

As shown in FIGS. 1 and 2, the quench zone HRI 100 is between the bottom of upper catalyst bed 105 and the top of the lower catalyst bed 110. There is a support system at the bottom of the upper catalyst bed 105 for supporting the bed. The HRI 100 includes the collection tray 115, the rough liquid distribution tray 120, and the vapor-liquid distribution tray 125.

In some embodiments, the mixing chamber 130 has an inner wall 135, an outer wall 140, and a top plate 145. The top plate 145 is typically situated on the top of the outer wall 140. The inner wall 135 does not extend up to the top plate 145. In some embodiments, there is no inner wall 135.

In other embodiments, the mixing chamber 130 has a plurality of inner vertical support plates 147 between the top plate 145 and collection tray 115 oriented tangentially to one or more concentric circles to support the top plate and to promote rotational fluid flow inside the mixing chamber 130.

The outer wall 140 has side spillways 150 to allow fluid to pass into the mixing chamber 130. There are directional baffles 155 extending from the outer wall 140 into the mixing chamber 130 at the side spillways 150. Side spillways 150 are typically extended from the collection tray 115 to the top plate 145. There are also top spillways 160 in the top plate 145. The total open area of top spillways 160 for fluid entry into the mixing chamber 130 is larger than the total open area of side spillways 150 for fluid entry to reduce pressure drop.

The annular zone 165 between the outer wall 140 and the reactor shell 210 is determined by the required space for installing the ring quench distributor 170 and is sized to maximize the diameter of the mixing chamber 130. The top spillways 160 are positioned close to the outer wall 140 to maximize their distance to the central opening 190 for increasing fluid residence time and improving mixing.

The downflow process vapor and liquid from the upper catalyst bed 105 fall onto the top plate 145 and the annular zone 165 between mixing chamber 130 and reactor shell 210. The quench fluid is injected mostly into the annular zone 165. Most of the vapor and some of the liquid enter the mixing chamber 130 through the top spillways 160 in the top plate 145. The rest of the liquid and vapor flows into the mixing chamber 130 through the side spillways 150 in the outer wall 140. This arrangement allows the height of the mixing chamber to be reduced with minimal impact on fluid mixing and pressure drop.

The injectors 167 for the quench fluid are typically directed tangential to the ring quench distributor 170.

In some embodiments, there can be a middle wall between the top spillways 160 and the inner wall 135 with spillways and directional baffles similar to the side spillways 150 and directional baffles 155 on the side wall. Alternatively, there can be a clearance between top of the middle wall and the top plate.

Figure 3:
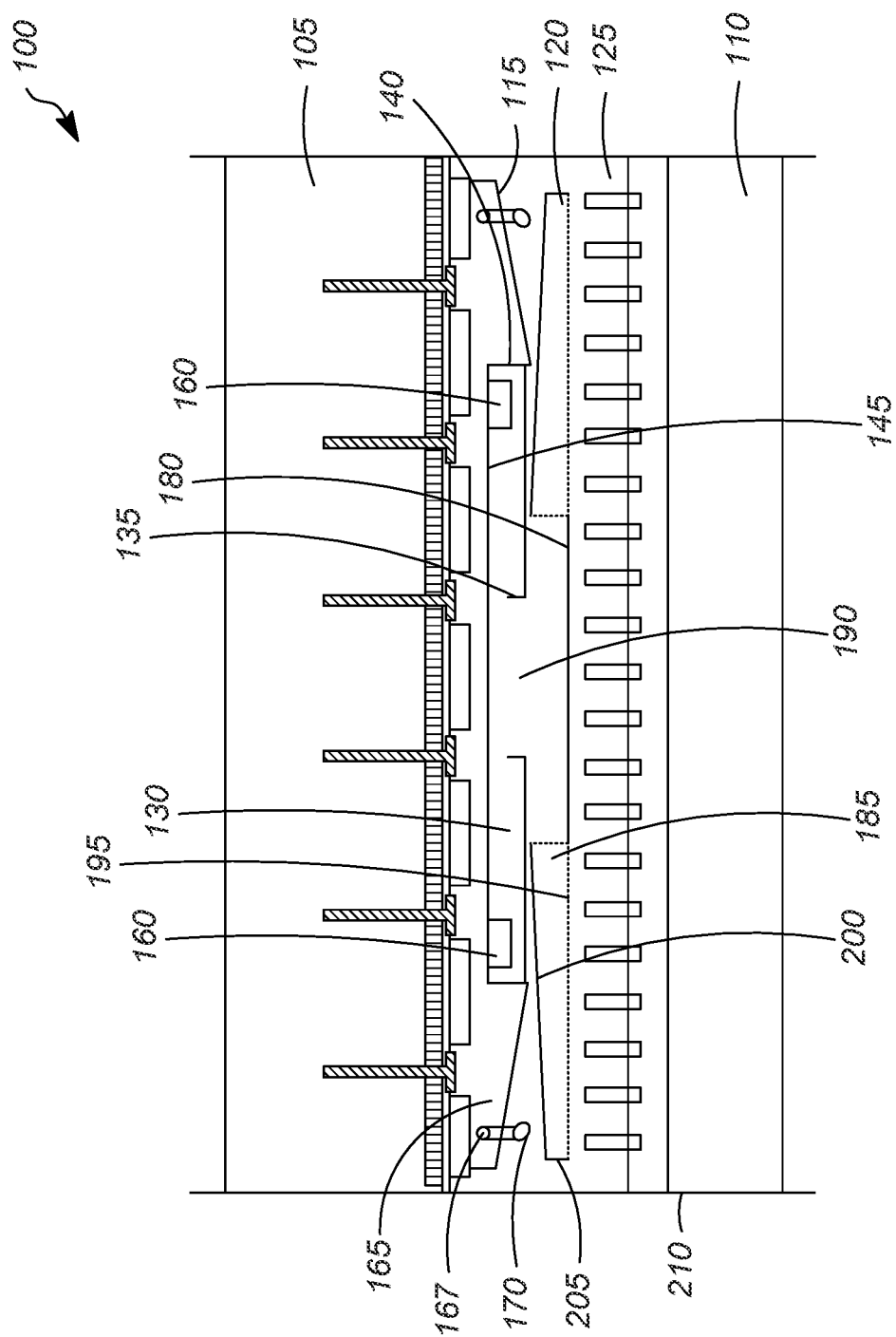
FIG. 3 is a cross section of another embodiment of the hydroprocessing reactor internals of the present invention.

In the embodiment of FIG. 3, the collection tray 115 outside the mixing chamber 130 is raised so that there is more space under the collection tray 115 for vapor expansion and for improving the quality of rough fluid distribution due to reduced fluid velocities around the rough liquid distribution tray 120. In this embodiment, the ring quench distributor 170 is mostly placed below the collection tray 115 with only injectors 167 extended above the collection tray 115 for quench fluid distribution.

The rough liquid distribution tray 120 comprises a central pan 180 and fluid distribution troughs 185.

All fluids flow in a swirl pattern towards center of the collection tray 115 for mixing and down through the central opening 190 in the collection tray 115, as shown in FIGS. 1 and 3.

As shown in FIGS. 1 and 3, the mixed fluids then enter into the central pan 180 and then fluid distribution troughs 185 attached to the central pan 180 for distribution. Liquid flows down to the vapor-liquid distribution tray 125 through holes in the perforated bottom plate 195 of the fluid distribution troughs 185, and vapor (gas) flows over the top of the side walls 200 and the end walls 205, and then into the spaces between the fluid distribution troughs 185 into vapor-liquid distribution tray 125 below.

The fluid distribution troughs 185 can be any suitable size and shape. The number, size, and shape of the troughs can be designed for accommodating various reactor sizes and vapor and liquid flow rates. Narrow fluid distribution troughs 185 (e.g., less than 30 inches) can be designed for passing through the manway in the reactor for easy installation with minimal sealing required. Multiple narrow fluid distribution troughs 185 also reduce the velocity of the vapor exiting from the fluid distribution troughs 185 through the clearance above the side walls 200 and end walls 205 of the fluid distribution troughs 185 to improve the quality of fluid distribution to the vapor-liquid distribution tray 125 below.

In one embodiment, the fluid distribution troughs 185 are constructed with a perforated bottom plate 195, sloped side walls 200, and an end wall 205. The end of the trough attached to the central pan 180 is open so that the fluid can enter the trough. The side walls 200 are sloped from a height close to the spacing between the rough liquid distribution tray 120 and the collection tray 115 on the side attached to central pan 180 to about 1 inch at the end wall 205 adjacent to the reactor shell 210. Typically, the height of the end wall 205 of the fluid distribution trough 185 is the same as the side walls 200 where they meet.

The description of the process and apparatus of the prior art and this invention are presented with reference to the attached Figures. The Figures are simplified diagrams of the prior art and various embodiments of the present invention and are not intended as an undue limitation on the generally broad scope of the description provided herein and the appended claims. Mechanical supports and hardware for attaching the HRI components to the supports have been omitted as not essential to a clear understanding of the invention.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

It should be appreciated and understood by those of ordinary skill in the art that various other components, such as beams, supports, and hardware, etc. were not shown in the drawings as it is believed that the specifics of same are well within the knowledge of those of ordinary skill in the art and a description of same is not necessary for practicing or understanding the embodiments of the present invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

Specific Embodiments

While the following is described in conjunction with specific embodiments, it will be understood that this description is intended to illustrate and not limit the scope of the preceding description and the appended claims.

A first embodiment of the invention is an apparatus for the mixing and distribution of fluid between catalyst beds comprising a collection tray comprising a central opening, the collection tray in fluid communication with a bottom of an upper catalyst bed; a mixing chamber above the collection tray, the mixing chamber positioned around the central opening, the mixing chamber having an outer wall located at a position inward of a reactor wall and a top plate attached to the outer wall, the outer wall having at least one side spillway to allow fluid to pass therethrough, and the top plate having at least one top spillway to allow fluid to pass therethrough, the top plate in fluid communication with the bottom of the upper catalyst bed; a ring quench distributor comprising an injector for injecting quench fluid into a space above the collection tray between the reactor wall and the outer wall; a rough liquid distribution tray comprising a central pan in fluid communication with the central opening of the collection tray; and a vapor-liquid distribution tray in fluid communication with the rough liquid distribution tray and a top of a lower catalyst bed. An embodiment of the invention is one, any or all of prior embodiments in this paragraph up through the first embodiment in this paragraph wherein the at least one top spillway is aligned with the at least one side spillway. An embodiment of the invention is one, any or all of prior embodiments in this paragraph up through the first embodiment in this paragraph wherein there are at least four top spillways and at least four side spillways. An embodiment of the invention is one, any or all of prior embodiments in this paragraph up through the first embodiment in this paragraph wherein the at least four top spillways are aligned with the at least four side spillways and wherein the at least four top spillways and the at least four side spillways are equally spaced around the mixing chamber. An embodiment of the invention is one, any or all of prior embodiments in this paragraph up through the first embodiment in this paragraph further comprising a directional baffle at the at least one side spillway. An embodiment of the invention is one, any or all of prior embodiments in this paragraph up through the first embodiment in this paragraph wherein the directional baffle extends inwardly into the mixing chamber. An embodiment of the invention is one, any or all of prior embodiments in this paragraph up through the first embodiment in this paragraph wherein the directional baffle extends outwardly into the space between the reactor wall and the outer wall. An embodiment of the invention is one, any or all of prior embodiments in this paragraph up through the first embodiment in this paragraph wherein the directional baffle forms an angle with respect to a tangent of the outer wall of less than 30°. An embodiment of the invention is one, any or all of prior embodiments in this paragraph up through the first embodiment in this paragraph wherein the outer wall has a height and wherein the at least one side spillway has a height equal to the height of the outer wall. An embodiment of the invention is one, any or all of prior embodiments in this paragraph up through the first embodiment in this paragraph wherein a floor of the collection tray outside the mixing chamber forms an angle with respect to a floor of the collection tray inside the mixing chamber. An embodiment of the invention is one, any or all of prior embodiments in this paragraph up through the first embodiment in this paragraph wherein the injector is positioned above the top plate of the mixing chamber. An embodiment of the invention is one, any or all of prior embodiments in this paragraph up through the first embodiment in this paragraph wherein the mixing chamber has a plurality of inner vertical support plates oriented tangentially to one or more concentric circles to support the top plate and to promote rotational fluid flow inside the mixing chamber.

A second embodiment of the invention is an apparatus for the mixing and distribution of fluid between catalyst beds comprising a collection tray comprising a central opening, the collection tray in fluid communication with a bottom of an upper catalyst bed; a mixing chamber above the collection tray, the mixing chamber positioned around the central opening, the mixing chamber having an outer wall located at a position inward of a reactor wall and a top plate attached to the outer wall, the outer wall having at least two side spillways to allow fluid to pass therethrough, and the top plate having at least two top spillways to allow fluid to pass therethrough, the at least two top spillways being aligned with the at least two side spillways, and wherein the at least two top spillways and the at least two side spillways being equally spaced around the mixing chamber, the top plate in fluid communication with the bottom of the upper catalyst bed; a ring quench distributor comprising an injector for injecting quench fluid into a space above the collection tray between the reactor wall and the outer wall; a rough liquid distribution tray comprising a central pan in fluid communication with the central opening of the collection tray; and a vapor-liquid distribution tray in fluid communication with the rough liquid distribution tray and a top of a lower catalyst bed. An embodiment of the invention is one, any or all of prior embodiments in this paragraph up through the second embodiment in this paragraph wherein there are at least four top spillways and at least four side spillways. An embodiment of the invention is one, any or all of prior embodiments in this paragraph up through the second embodiment in this paragraph further comprising a directional baffle at the at least one side spillway. An embodiment of the invention is one, any or all of prior embodiments in this paragraph up through the second embodiment in this paragraph wherein the directional baffle extends inwardly into the mixing chamber or wherein the directional baffle extends outwardly into the space between the reactor wall and the outer wall; and wherein the directional baffle forms an angle with respect to a tangent of the outer wall of less than 30°. An embodiment of the invention is one, any or all of prior embodiments in this paragraph up through the second embodiment in this paragraph wherein the outer wall has a height and wherein the at least two side spillways have a height equal to the height of the outer wall. An embodiment of the invention is one, any or all of prior embodiments in this paragraph up through the second embodiment in this paragraph wherein a floor of the collection tray outside the mixing chamber forms an angle with respect to a floor of the collection tray inside the mixing chamber. An embodiment of the invention is one, any or all of prior embodiments in this paragraph up through the second embodiment in this paragraph wherein the injector is positioned above the top plate of the mixing chamber. An embodiment of the invention is one, any or all of prior embodiments in this paragraph up through the second embodiment in this paragraph wherein the mixing chamber has a plurality of inner vertical support plates oriented tangentially to one or more concentric circles to support the top plate and to promote rotational fluid flow inside the mixing chamber Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A device for the mixing and distribution of fluid between catalyst beds comprising:
    a collection tray comprising a central opening, the collection tray in fluid communication with a bottom of an upper catalyst bed;
    a mixing chamber above the collection tray, the mixing chamber positioned around the central opening, the mixing chamber having an outer wall located at a position inward of a reactor wall and a top plate attached to the outer wall, the outer wall having at least one side spillway to allow fluid to pass therethrough, and the top plate having at least one top spillway to allow fluid to pass therethrough, the top plate in fluid communication with the bottom of the upper catalyst bed;
    a ring quench distributor comprising an injector for injecting quench fluid into a space above the collection tray between the reactor wall and the outer wall;
    a rough liquid distribution tray comprising a central pan in fluid communication with the central opening of the collection tray; and
    a vapor-liquid distribution tray in fluid communication with the rough liquid distribution tray and a top of a lower catalyst bed.

2. The device of claim 1 wherein the at least one top spillway is aligned with the at least one side spillway.

3. The device of claim 1 wherein there are at least four top spillways and at least four side spillways.

4. The device of claim 3 wherein the at least four top spillways are aligned with the at least four side spillways and wherein the at least four top spillways and the at least four side spillways are equally spaced around the mixing chamber.

5. The device of claim 1 further comprising a directional baffle at the at least one side spillway.

6. The device of claim 5 wherein the directional baffle extends inwardly into the mixing chamber.

7. The device of claim 5 wherein the directional baffle extends outwardly into the space between the reactor wall and the outer wall.

8. The device of claim 5 wherein the directional baffle forms an angle with respect to a tangent of the outer wall of less than 30°.

9. The device of claim 1 wherein the outer wall has a height and wherein the at least one side spillway has a height equal to the height of the outer wall.

10. The device of claim 1 wherein a floor of the collection tray outside the mixing chamber forms an angle with respect to a floor of the collection tray inside the mixing chamber.

11. The device of claim 1 wherein the injector is positioned above the top plate of the mixing chamber.

12. The device of claim 1 wherein the mixing chamber has a plurality of inner vertical support plates oriented tangentially to one or more concentric circles to support the top plate and to promote rotational fluid flow inside the mixing chamber.

13. A device for the mixing and distribution of fluid between catalyst beds comprising:
    a collection tray comprising a central opening, the collection tray in fluid communication with a bottom of an upper catalyst bed;
    a mixing chamber above the collection tray, the mixing chamber positioned around the central opening, the mixing chamber having an outer wall located at a position inward of a reactor wall and a top plate attached to the outer wall, the outer wall having at least two side spillways to allow fluid to pass therethrough, and the top plate having at least two top spillways to allow fluid to pass therethrough, the at least two top spillways being aligned with the at least two side spillways, and wherein the at least two top spillways and the at least two side spillways being equally spaced around the mixing chamber, the top plate in fluid communication with the bottom of the upper catalyst bed;

a ring quench distributor comprising an injector for injecting quench fluid into a space above the collection tray between the reactor wall and the outer wall;

a rough liquid distribution tray comprising a central pan in fluid communication with the central opening of the collection tray; and a vapor-liquid distribution tray in fluid communication with the rough liquid distribution tray and a top of a lower catalyst bed.

14. The device of claim 13 wherein there are at least four top spillways and at least four side spillways.

15. The device of claim 13 further comprising a directional baffle at the at least one side spillway.

16. The device of claim 15 wherein the directional baffle extends inwardly into the mixing chamber or wherein the directional baffle extends outwardly into the space between the reactor wall and the outer wall; and wherein the directional baffle forms an angle with respect to a tangent of the outer wall of less than 30°.

17. The device of claim 13 wherein the outer wall has a height and wherein the at least two side spillways have a height equal to the height of the outer wall.

18. The device of claim 13 wherein a floor of the collection tray outside the mixing chamber forms an angle with respect to a floor of the collection tray inside the mixing chamber.

19. The device of claim 13 wherein the injector is positioned above the top plate of the mixing chamber.

20. The device of claim 13 wherein the mixing chamber has a plurality of inner vertical support plates oriented tangentially to one or more concentric circles to support the top plate and to promote rotational fluid flow inside the mixing chamber.

\* \* \* \* \*